United States Patent [19]
Lovell et al.

[11] Patent Number: 6,067,527
[45] Date of Patent: May 23, 2000

[54] POINT OF SALE SYSTEM, METHOD OF OPERATION THEREOF AND PROGRAMMING FOR CONTROL THEREOF

[75] Inventors: Christopher D. Lovell, High Point; William S. Johnson, Jr., Jamestown; Philip A. Robertson, Greensboro; John S. Sabol, Colfax, all of N.C.

[73] Assignee: Gilbarco, Inc., Greensboro, N.C.

[21] Appl. No.: 08/542,250

[22] Filed: Oct. 12, 1995

[51] Int. Cl.[7] .................................................. H04M 11/00
[52] U.S. Cl. ............................................................ 705/21
[58] Field of Search ............................ 395/200.3, 200.5; 364/130–132, 497, 138; 705/20, 21, 16, 17

[56] References Cited

U.S. PATENT DOCUMENTS

| | | | |
|---|---|---|---|
| 4,550,859 | 11/1985 | Dow, Jr. et al. ........................... | 222/26 |
| 4,855,905 | 8/1989 | Estrada et al. ......................... | 364/238.4 |
| 4,855,908 | 8/1989 | Shimode et al. ........................... | 705/20 |
| 4,875,186 | 10/1989 | Blume, Jr. ................................ | 364/900 |
| 4,887,202 | 12/1989 | Tanaka et al. ........................... | 364/200 |
| 4,972,463 | 11/1990 | Danielson et al. ......................... | 379/91 |
| 5,239,662 | 8/1993 | Danielson et al. ....................... | 395/800 |
| 5,261,079 | 11/1993 | Celi, Jr. .................................... | 395/500 |
| 5,270,943 | 12/1993 | Warn ........................................ | 364/479 |
| 5,299,135 | 3/1994 | Lieto et al. .............................. | 364/479 |
| 5,394,336 | 2/1995 | Warn et al. .............................. | 364/479 |
| 5,400,253 | 3/1995 | O'Connor ................................ | 364/442 |
| 5,500,890 | 3/1996 | Rogge et al. ............................. | 379/91 |
| 5,590,288 | 12/1996 | Castor ................................. | 395/200.03 |
| 5,696,909 | 12/1997 | Wallner ................................. | 395/244 |

Primary Examiner—Melanie A. Kemper
Attorney, Agent, or Firm—Coats & Bennett, P.L.L.C.

[57] ABSTRACT

The present invention is a point of sale system, method of operation and a control program for use within a point of sale system. The point of sale system includes at least one operator console controlled with the control program with each operator console communicating with at least one console device connected thereto with a control program being executable by a site controller processor of the point of sale system which is operatively associated with a coresident console and being executable by a remote console processor within each console which is remote from the site controller and connected to the site controller by a communications link. The programming includes coresident console application programming for controlling operation of a coresident operator console which is executable by the site controller processor and remote console application programming for controlling operation of each remote console within the point of sale system.

62 Claims, 5 Drawing Sheets

POINT OF SALE SYSTEM, METHOD OF OPERATION THEREOF AND PROGRAMMING FOR CONTROL THEREOF

TECHNICAL FIELD

The present invention relates to point of sale systems and the method of operation thereof and articles of manufacture including control programs for use in controlling point of sale systems including, but not limited to, a preferred application of point of sale systems used in conjunction with petroleum dispensing systems.

BACKGROUND ART

FIG. 1 illustrates a block diagram of a point of sale system 10 developed and marketed by the Assignee in the petroleum industry. The point of sale system has a master console 12 and a slave console 14 which have an identical architecture. The master console 12 includes a processor, not illustrated, which controls the slave console. The slave console 14 also includes a processor. The master console 12 and the slave console 14 provide a fuel dispensing station with two consoles each of which contains a keyboard 16, a cash drawer 18 and an operator display 20. The master console also controls one or more fuel dispensers 22 which are used by customers of the fuel dispensing station to purchase fuel. The keyboards 16, cash drawers 18 and operator displays 20 function in conjunction with the master console 12 and the slave console 14 to control the collection of money associated with the sale of petroleum products as recorded by the dispensers 22 and process and display information pertaining to the sale of the petroleum products. As indicated in parenthesis, the Assignee's product designation for systems of this configuration is TCRG.

The prior art system 10 of FIG. 1 has distinct disadvantages. First, its architecture only permits the implementation of two consoles. In large fuel dispensing stations it is necessary to have more than two consoles to completely service the customer base which is purchasing fuel from a large number of fuel dispensers 22 which requires additional master-slave console pairs to be installed. Furthermore, in addition to having a limited number of consoles, the overall cost of the system is high because both the master console and slave console contain the same hardware which, when in use, has the on-board control function of the slave console disabled, thereby adding the expense of processing hardware to the system which is not used. The overall system 10 is controlled only by the processor resident in the master console 12.

FIG. 2 illustrates a point of sale system 30 which was developed in the petroleum industry subsequent to the point of sale system 10 illustrated in FIG. 1. The point of sale system 30 is controlled by a controller 32 which contains a host processor controlling the overall functioning of the system. The controller 30 controls the overall operation of fuel dispensers 22, communications to and from a credit network 34, communications to and from a tank monitor 36 which monitor the level of fuel in the various tanks associated with the fuel dispensing station and other equipment 38 which is diverse in design and depends upon the particular fuel dispensing station functionality. It should be noted that the dispenser 22, credit network 34, tank monitor 36 and other equipment 38 are connected to the controller 32 by serial communications links 60. The dispensers 22, credit network 34, tank monitor 36 and other equipment 38 function as peripheral devices of the processor resident in the controller 32.

The site controller 32 is connected by a serial communications link 60 to at least one peripheral operator console 40. The number of peripheral operator consoles is variable. The Assignee's version of this system, which was marketed under the trademark G-SITE™, has up to four peripheral operator consoles 40. Each operator console 40 includes a processor which controls a plurality of peripheral devices which include a personal identification number pad 42, a card reader 44, for reading the magnetic stripe associated with a credit card used for the purchasing of products, a keyboard 46, a cash drawer 48, and a customer display 50. All of these peripheral devices are well known in their use with point of sale systems such as those in the petroleum industry.

The prior art system of FIG. 2 has disadvantages. First, every operator console 40 includes its own microprocessor control which requires a housing and power supply which adds to the overall cost of the system. The primary disadvantage of the system 30 of FIG. 2 is that, even for systems having a single operator console, it is necessary to have at least two separate computer systems with the first computer system being resident in the site controller 32 for controlling the dispensers 22, credit network 34, tank monitor 36 and other equipment 38 and the one or more additional computer systems resident in each of the operator consoles 40 which are required to control the pin pad 42, card reader 44, keyboard 46 cash drawer 48 and customer display 50, as peripheral devices to the processor in each operator console. Furthermore, this system has an additional disadvantage of requiring additional counterspace because the housing for each of the operator consoles 40 is separate from that of the site controller 32. In point of sale systems, such as in fuel dispensing stations, counterspace is extremely valuable and hard to obtain. Any reduction in physical size of the hardware required to implement a system including required counterspace provides a distinct marketing advantage to influence customers to purchase the system if they do not have unlimited valuable and scarce counterspace. In summary, the system 30 of FIG. 2 suffers from having a relative high cost which is sufficiently high to influence sales to operators of petroleum stations and is physically large enough in size to make its installation a potential problem in stations not having unlimited counterspace.

DISCLOSURE OF INVENTION

The present invention is an improved point of sale system having a preferred application in petroleum stations, console application programming, which is universally usable to implement operator consoles either coresident with a site controller of the point of sale system or remote from the site controller. The present invention also is a method of operation of a point of sale system having the aforementioned attributes. Finally, the invention is a memory device storing console application programming which is universally usable to control either coresident or remote operator consoles.

With the invention, an operator console is coresident with the site controller and is controlled concurrently by running application programming on a site controller processor for implementing the operator console function with site control application programming with the console application programming for implementing the coresident operator console also being operational in remote operator consoles. The console application programming, as loaded in a memory associated with the site controller processor and a memory associated with each processor in a remote console, is identical. As a result, a universal console application program is provided in accordance with the invention for controlling all operator console functions within a point of sale system including an operator console coresident with the site controller and optionally, at least one remote console. The universal console application programming may be executed by point of sale systems which have any where from one operator console, which may be coresident with the site controller, to a plurality of remote consoles which may vary in number in accordance with the system architecture and which are coresident with the site controller and remote from the site controller or which are all remote from the site controller.

In accordance with the invention, the console application programming is also an article of manufacture in the form of a memory device storing the console application programming, such as, but not limited to, a floppy disk, which can be booted and run on a remote console processor or, alternatively, be loaded onto the site controller processor mass storage device such as, but not limited to, a disk drive so that the site control application programming and the console application programming are concurrently run and coresident in the memory of the site controller. When the console application runs in a stand alone console processor which is remote (typically physically separated from the site controller by a wireline serial communications link) from the site controller, the console application programming is booted from a floppy disk which additionally contains a copy of the operating system of the remote console application programming which is loaded into a memory associated with the remote processor of the remote console. Each remote console processor functions as a peripheral device of the processor of the site controller. Duplicate floppy disks storing the console application programming and the remote operator console operating system are used to boot all stand alone remote consoles which are remote or separate from the site controller and provide the coresident console function which is also loaded into the mass storage device such as, but not limited to, a disk drive of the controller of the site processor. The site processor concurrently runs the console application and the site control application software as coresident programs.

Because the console application programming is compiled separately from the site controller application programming, maintenance and installation of both the site controller application programming (a different one for every different customer) and the console application programming (a generic application used for every different customer) is simplified. As a result, changes in the customer specific site control application programming may be made without affecting the generic console application programming so that different customer requirements may be customized for controlling the functioning of dispensers, a credit network, a tank monitor and other equipment as commonly used in point of sale systems used in the petroleum industry and other point of sale systems not specialized for the petroleum industry. Furthermore, because the console application programming is identical and universal for both the control of the coresident console which is contained in the housing of the site controller, as well all the remote consoles, all of the various control functions for driving the various operator console peripheral devices, such as a pin pad, card reader, keyboard, customer cash drawer and customer display, may be generically designed for supporting off the shelf equipments. This minimizes the specialization required for marketing in the petroleum industry and other point of sale applications to only include special functions controlled by the site controller which are independent of the operator console functions.

Finally, because the coresident console is contained in the housing of the site controller, uses its power supply and the site control application programming and the coresident console application programming are concurrently executed by the site controller processor, the additional expense of a processor and programming for implementing the console function is reduced by the cost of the elimination of a processor and programming as used in the prior art, as illustrated in FIG. 2, to implement each operator console 40.

While the present invention has a preferred application in point of sale systems used in conjunction with petroleum stations, it should be understood that the present invention is not limited thereto.

A control program for use within a point of sale system including at least one operator console controlled with the control program with each operator console communicating with at least one console device connected thereto with the control program being executable by a site controller processor of the point of sale system which is operatively associated with a local coresident console and being executable by a remote console processor within each console which is remote from the site controller and connected to the site controller by a communications link in accordance with the invention includes coresident console application programming for controlling operation of a coresident operator console which is executable by the site controller processor; and remote console application programming for controlling operation of each remote console within the point of sale system. The coresident console application programming is further for controlling transmission of information from the coresident operator console to the at least one console device which is connected thereto and for controlling processing of information received from the at least one console device connected thereto; and the remote console application programming is further for controlling transmission of information from any remote console to at least one remote console device which is connected thereto and for controlling processing of information received from the at least one remote console device connected thereto. The coresident and remote console application programming and site control application programming controls the formatting of information transmitted between the console application programming and the site control application programming with an identical message level protocol. The site control application programming is further for controlling at least one peripheral device connected to the site controller with the site control application programming and the coresident console application programming being executable concurrently by the site controller processor, at least one internal message transfer implemented in programming for controlling transmission of information between the site control application programming and the coresident console application programming including the transmission of information to the coresident console and programming for controlling the transmission of information from the site controller application programming to any remote console application programming over the communications link. The console application programming as loaded into a memory associated with the site controller processor and as loaded into a memory associated with each remote console processor is identical.

A point of sale system in accordance with the invention includes a site controller including a site controller processor controlling at least one peripheral device connected thereto with a communications link and controlling a coresident console with the coresident console being connected to at least one console device which is controlled by the coresident console; at least one remote console with each remote console being a peripheral device of the site controller processor and being connected to at least one remote console device which is controlled by a remote processor of the remote console connected thereto; a communications link connecting the site controller to the at least one remote console transmitting information between the site controller and the at least one remote console; and a console application program controlling each of the consoles with the console application program including coresident console application programming controlling operation of the coresident console which is executed by the site controller processor and remote console application programming controlling operation of each remote console within the point of sale system which is executed by each remote processor. The coresident console application programming also controls transmission of information from the coresident console to the at least one console device connected thereto and controls processing of information received from the at least one console device connected thereto; and the remote console application programming also controls transmission of information from the at least one remote console to the at least one remote console device connected thereto and controls processing of information received from the at least one remote console device connected thereto. The coresident and remote console application programming and the site application programming formats communications transmitted therebetween with an identical message level protocol. The point of sale system further includes site control application programming controlling at least one peripheral device connected to the site controller with the site control application programming and the coresident console application programming being executable concurrently by the site controller processor, at least one internal message transfer implemented in programming controlling transmission of information between the site control application programming and the coresident console application programming and programming controlling the transmission of information from the site controller application programming to any remote console application programming over the communications link. The point of sale system further includes site control application programming controlling transmission of communications from the site control application programming to a plurality of console application programs including the coresident console application programming and each remote console application programming. The remote console application programming controls transmission of communications from the remote console application programming to the site control application programming of the point of sale system with the remote console application programming causing the communications link to transmit the information from the remote console application programming to the site controller and the transmission of communications to the site controller being determined by an interrogation of an operating mode of the console application programming.

A method of operation of a point of sale system having a site controller including a site controller processor controlling at least one peripheral device connected thereto with a communications link and controlling a coresident console with the coresident console being connected to at least one console device which is controlled by the coresident console, at least one remote console with each remote console being a peripheral device of the site controller processor and being connected to at least one remote console device which is controlled by a remote processor of the remote console connected thereto, a communications link connecting the site controller to the at least one remote console for transmitting information between the site controller and the at least one remote console, and a console application program in accordance with the invention includes controlling operation of the coresident console with coresident console application programming within the console application program which is executed by the site controller processor; and controlling operation of each remote console within the point of sale system with remote application programming within the console application program which is executed by each remote processor. The method further includes controlling transmission of information from the coresident console to the at least one console device connected thereto and processing of information received from the at least one console device connected thereto with the coresident console application programming; and controlling transmission of information from the at least one remote console to the at least one remote console device connected thereto and controlling processing of information received from the at least one remote console device connected thereto with the remote application programming. The method in accordance with the invention further includes controlling formatting of information transmitted between the coresident and remote console application programming and site control application programming with an identical message level protocol. The method further includes controlling at least one peripheral device connected to the site controller with the site control application programming and the coresident console application programming being executable concurrently by the site controller processor, controlling transmission of information between the site control application programming and the coresident console application programming with at least one internal message transfer and controlling the transmission of information from the site controller application programming to any remote console application programming over the communications link with the site control application programming. The method further includes controlling transmission of communications from the site control application programming to a plurality of console application programs including the coresident console application programming and each remote console application programming with site control application programming. A method in accordance with the invention further includes controlling transmission of communications from the remote console application programming to the site control application programming of the point of sale system with the remote console application programming causing the communications link to transmit the information from the remote console application programming to the site controller and controlling the transmission of communications from the console application programming to the site controller by an interrogation of an operating mode of the console application programming.

A control program for use within a point of sale system including at least one operator console controlled with the control program with each operator console communicating with at least one console device connected thereto with information transmitted to and from each operator console being formatted with a message level protocol with the control program being executable by a site controller processor of the point of sale system and being executable by a remote console processor controlling each console which is remote from the site controller and connected to the site controller by a communications link in accordance with the invention includes coresident console application programming, for execution by the site controller processor, for controlling communications between site control application programming and coresident console application programming including formatting information for transmission between the site control application programming and the local console application programming with the message level protocol; and remote console application programming, for execution by each remote console processor, for controlling communications on a communications link between the site control application programming and the remote console application programming including formatting information with the message level protocol for transmission between the site control application programming and the remote console application programming. The coresident console application programming further is for controlling communications between the coresident console application programming and the site control application programming and for controlling at least one peripheral device coupled to a coresident operator console with a communication link; and the remote console application programming further is for controlling communications between each remote console and at least one remote console device connected thereto and processing information received from the at least one console device connected thereto for transmission to the site controller. The site control application programming is further for controlling at least one peripheral device and for controlling transmission of communications to at least one console application programming from the site control application programming. The site control application programming controls transmission of communications to a plurality of console application programs, including the transmission of information from the site control application programming to the coresident console application programming and the transmission of information from the site control application programming on the communications link to the at least one remote console application programming. Programming within the site control application programming and the console application programming uses at least one internal message transfer implemented with programming to transmit the information between the site application control programming and the coresident console application programming and uses the communications link to transmit the information to the at least one remote console application programming. The console application programming as loaded into a memory associated with the site controller processor and as loaded into memory associated with each remote console processor is identical.

Site control application programming for use within a point of sale system including a plurality of operator consoles with each operator console communicating with at least one console device connected thereto with the site control application programming being executable by a site controller processor in accordance with the invention includes programming within the site control application programming for controlling transmission of communications from the site control programming to a plurality of operator console application programs including a coresident operator console application programming controlled by the site controller processor and at least one remote operator console application programming with each remote console application programming being executable by a remote console processor. The programming within the site controller application programming and the site application programming uses an internal message transfer implemented with programming to transmit the information between the site application control programming and coresident console application programming and uses a communications link to transmit the information to each remote console application programming.

Remote console application programming for use within a point of sale system having a site controller and a plurality of operator consoles with each operator console communicating with at least one console device connected thereto with the remote console application programming being executable by a remote console processor coupled to the site controller in accordance with the invention includes programming within the remote console application programming for controlling transmission of communications from the remote console application programming to the site controller of the point of sale system with the programming within the remote console application programming causing a communications link to transmit communications from the remote console application programming to the site controller and the transmission to the site controller being controlled by interrogation of an operating mode of the console application programming.

Coresident console application programming for use within a point of sale system including a coresident operator console communicating with at least one console device connected thereto with the coresident console application programming being executable by a site controller processor of a site controller coresident with the coresident operator console in accordance with the invention includes programming for controlling transmission of communications from the coresident console application programming to site control application programming for controlling the site controller which controls at least one device connected thereto with a communications link. The coresident console application programming and the site control application programmer further includes an internal message transfer implemented with programming to transmit the communications between the coresident console application programming and the site application control programming.

A point of sale system in accordance with the invention further includes a site controller including a site controller processor controlling at least one peripheral device connected thereto with a communications link and controlling a coresident console with the coresident console being connected to at least one console device which is controlled by the coresident console with the site controller and coresident console having a common housing and a power supply; and console application programming for controlling operation of the coresident console and site control application programming for controlling operation of the site controller with the site control and coresident console application programming being concurrently executed by the site controller processor. The site control application programming controls at least one peripheral device connected to the site controller and at least one internal message transfer is implemented in programming controlling transmission of information between the site control application programming and the coresident console application programming. Communications between the site control application programming and the coresident operator console programming use an identical message level protocol.

BRIEF DESCRIPTION OF DRAWINGS

Like reference numerals identify like parts throughout the drawings.

BEST MODE FOR CARRYING OUT THE INVENTION

Figure 3:
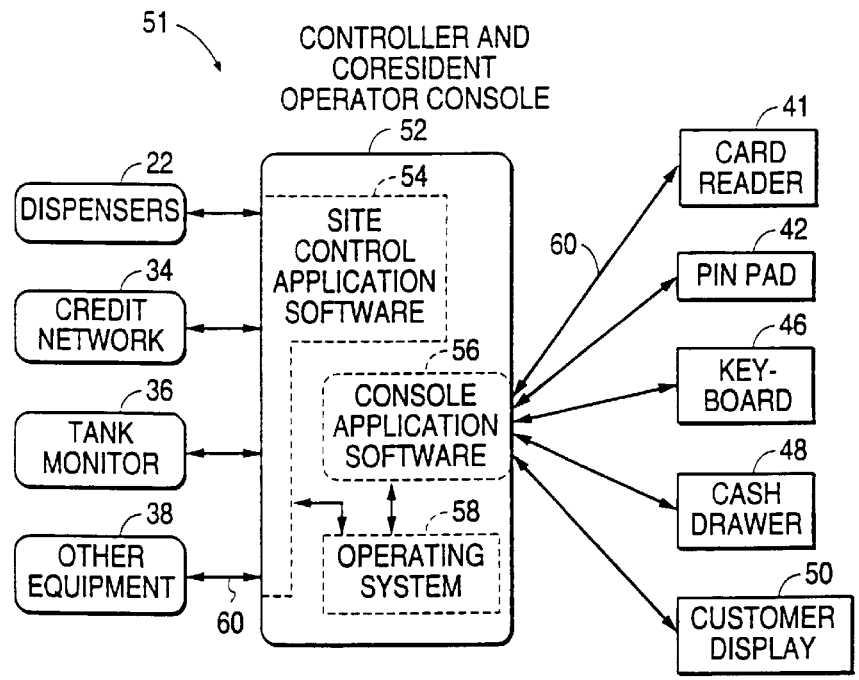
FIG. 3 is a block diagram of a first embodiment of the present invention illustrating hardware and software utilized for practicing of the present invention.
Figure 4:
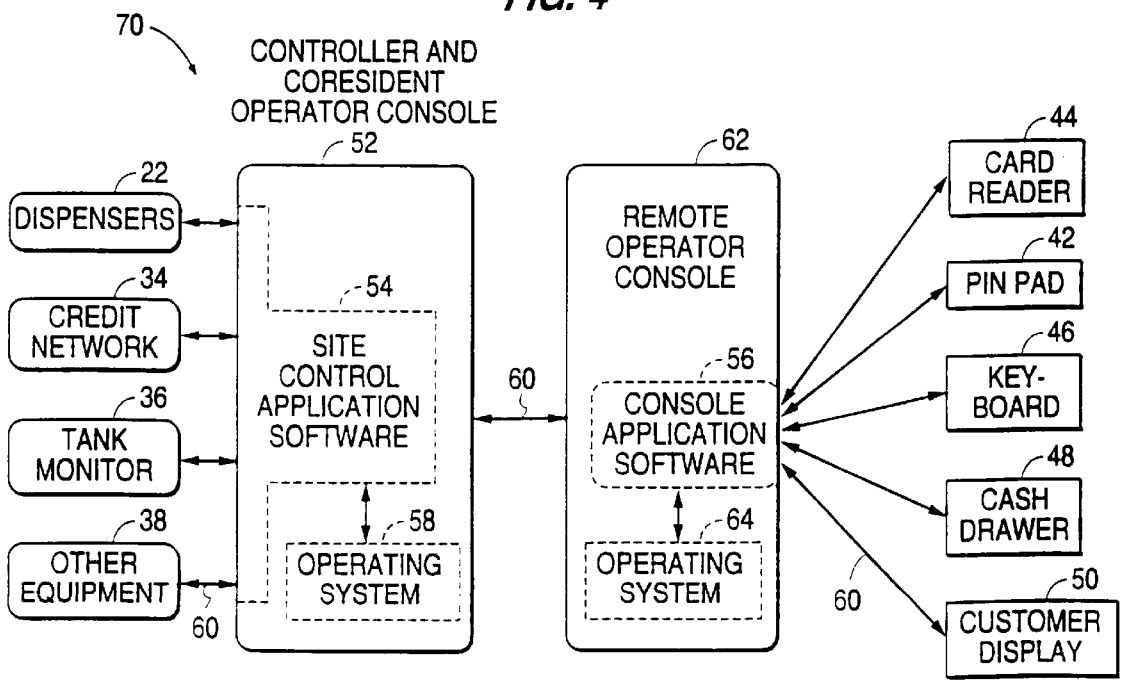
FIG. 4 is a block diagram of a second embodiment of the invention illustrating hardware and software used for practicing of the present invention.
Figure 5:
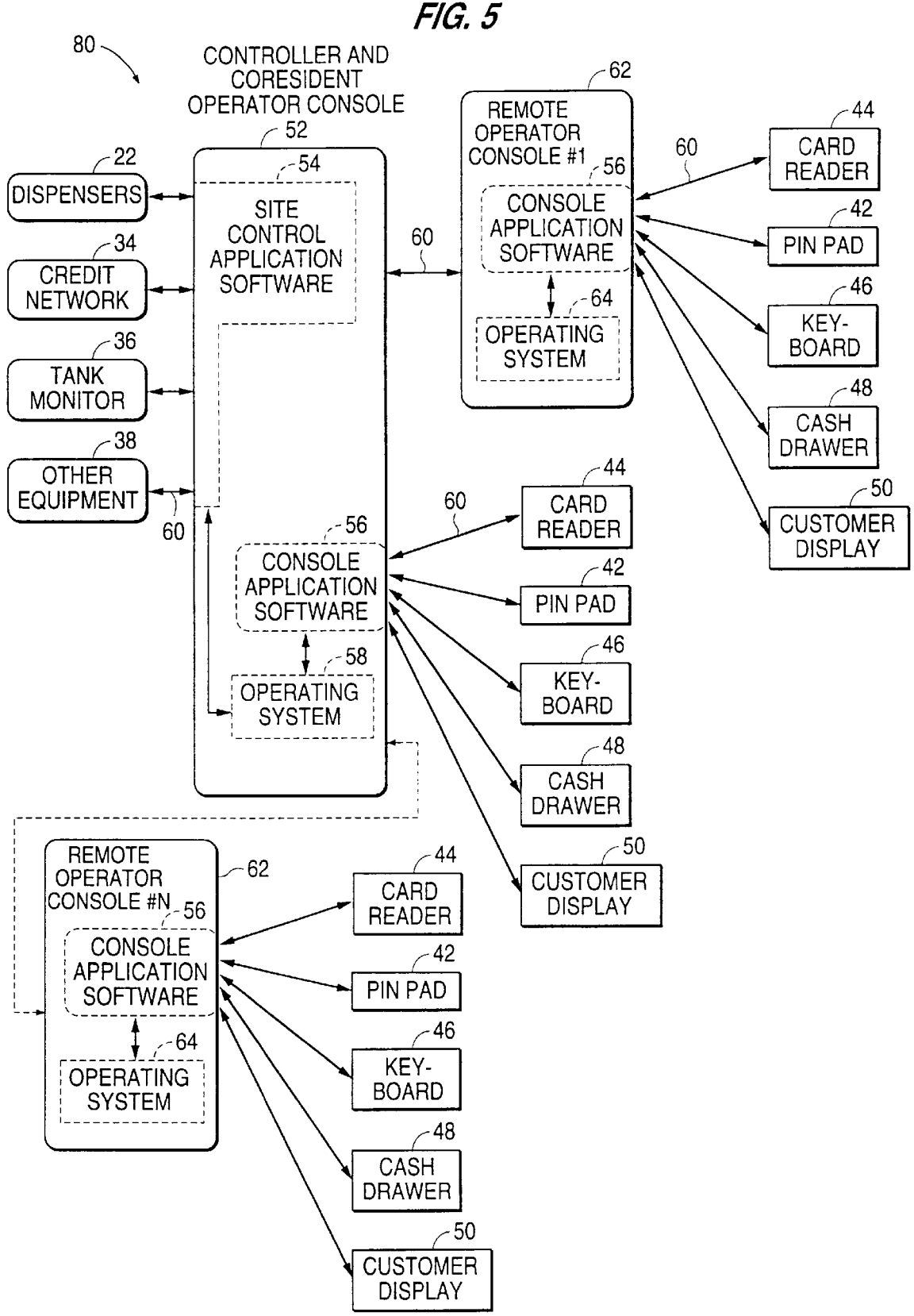
FIG. 5 is a block diagram of a third embodiment of the invention illustrating hardware and software utilized for practicing of the present invention.

The present invention may be practiced in accordance with preferred embodiments illustrated in FIGS. 3–6. The programming contained in the disk within the Appendix may be used to implement control functions of the systems within FIGS. 3, 5 and 6, as described in the description of the Appendix, when loaded into the processor within the site controller and coresident operator console and, where remote consoles are present, within the processor contained in each remote console of the point of sale systems currently marketed to the petroleum industry by the Assignee as the G-SITE™. The software contained in the aforementioned Appendix includes a listing of console application software which is concurrently executable with site control application software in association with the site controller processor and remote console application software which is executable by the remote console processor associated with each remote console as illustrated in FIG. 5. Moreover, the software of the Appendix may be modified to implement the system of FIG. 4 which only includes at least one remote operator console(s) and does not therefore include an operator console as part of the site controller.

Figure 2:
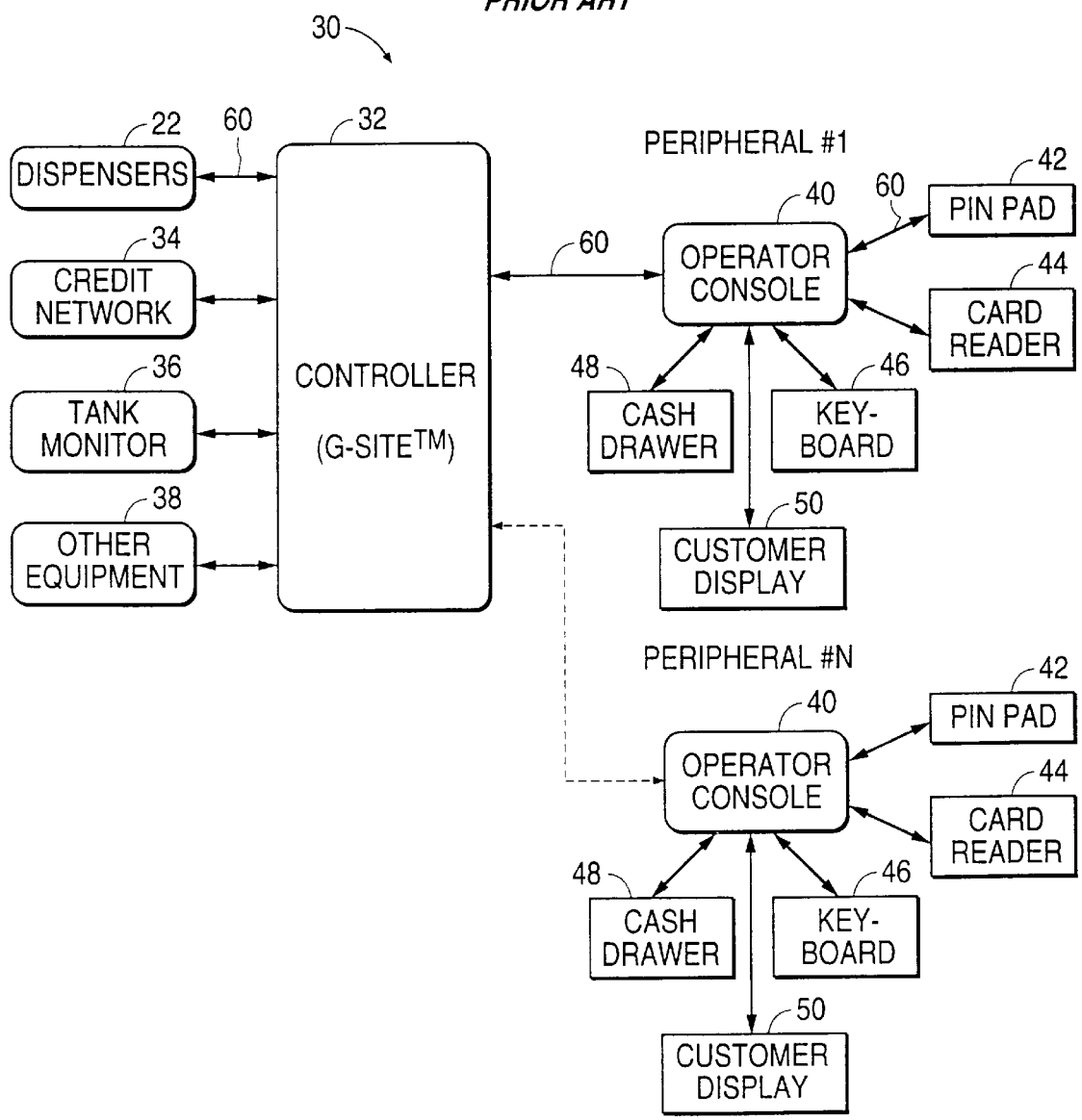
FIG. 2 is a block diagram of a prior art point of sale system utilized in the petroleum industry.

The universal executability of the console application software either alone by the processor of the site controller or also by each remote processor, permits the control functions of each console to be made generic to all customers while at the same time permitting customizing of site control application software which is the practice of the manufacturers of point of sale systems in the petroleum industry. The hardware and software architecture of the present invention eliminates the cost and spatial requirements of a processor. The first console which, as illustrated in FIGS. 3 and 5, is coresident within the site controller housing is controlled by the site controller processor which eliminates the need for a separate operator console processor, housing and power supply as in the prior art of FIG. 2. As a result, the overall expense of the systems, as illustrated in FIGS. 3–6, is reduced and further, maintenance and the ease of installation of operator consoles is simplified by providing universal console application software and the separation of site control application functions from console application functions.

FIG. 3 illustrates a block diagram of a first embodiment 51 in accordance with the present invention. A site controller 52 includes, preferably, but is not limited thereto, a 486 type microprocessor and associated memory which executes site control application software 54, coresident console application software 56 under control of operating system 58. Additionally, fuel dispensers 22, credit network 34, a tank monitor 36 and other equipment 38 are coupled to the site controller 52 via a communications link 60 which is typically a serial communications link. As illustrated, a pin pad 42, a card reader 44, keyboard 56, cash drawer 48 and customer display 50 are connected to the site controller and are in communication with console application software 56 over serial communications links 60. Communications between the site control application software 54 and the console application software 56 in the site controller 52 are formatted with an identical message level protocol. The transmission of information between the site control application software 54 and the console application software 56 utilizes at least one internal message transfer which is implemented in programming which may be one or more mailboxes.

Figure 1:
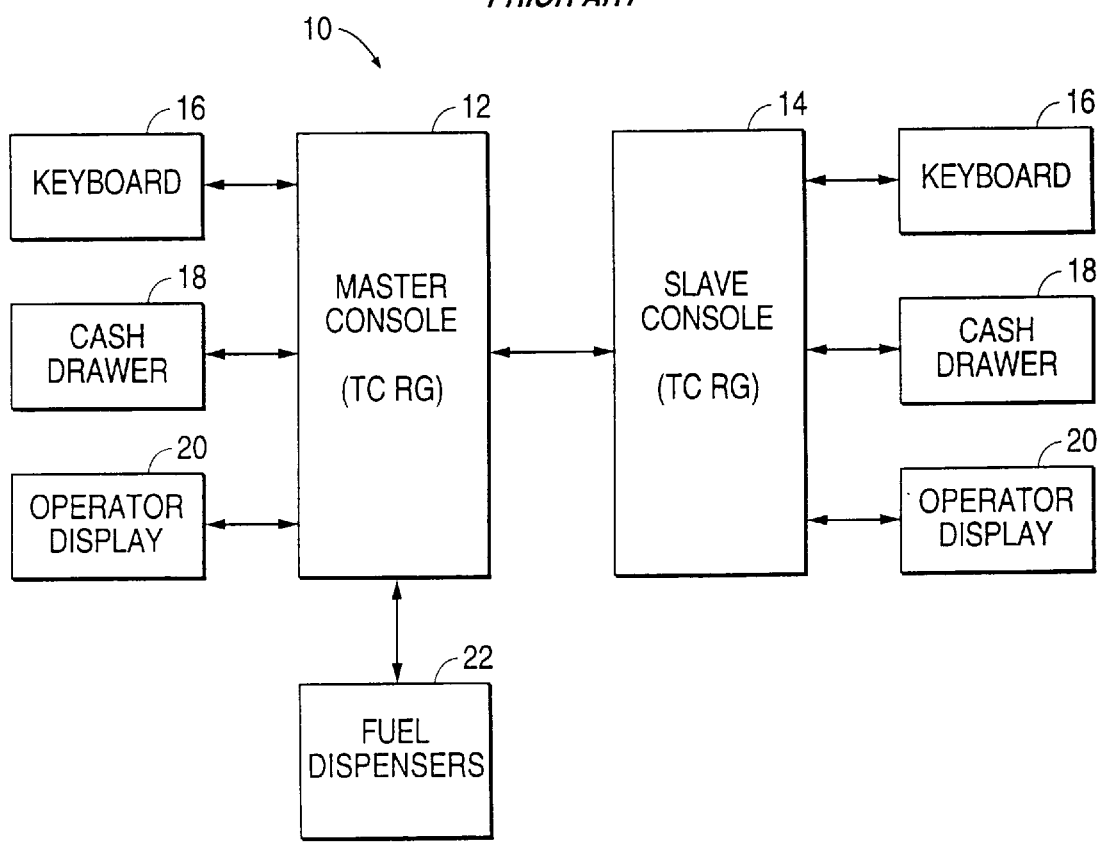
FIG. 1 is a block diagram of a prior art point of sale system utilized in the petroleum industry.

The hardware and software configuration illustrated in the embodiment of FIG. 3 eliminates the need for a separate processor to execute the console application software as well as a separate housing and power supply. As a result, only a single power supply, processor and housing are needed to support the execution of the site control application software 54 and the console application software 56 concurrently by the site controller microprocessor. The result is a reduced cost in manufacturing as compared to the prior art systems of FIGS. 1 and 2 and reduced cost for installation and maintenance.

FIG. 4 illustrates a second embodiment 70 of the present invention including a hardware and software block diagram thereof. The difference between the embodiment of FIG. 3 and the embodiment of FIG. 4 is that the operator console is one of at least one remote operator console (a single remote operator console is illustrated for purpose of convenience) with there being no coresident operator console contained within the site controller 52. The site control application software communicates with the console application software 56 within the remote operator console 62 over the serial communications link 60. Each remote operator console 62 has a remote operator processor and associated memory for executing the remote console application software 56. The console application programming within the disk of the Appendix requires modification to control the embodiment of FIG. 4.

The console application software 56 of the embodiment of FIG. 3 and the console application software 56 of the embodiment of FIG. 4 differs in that in the embodiment of FIG. 3 the processor which is resident in the site controller 52 executes the console application software 56 whereas in the embodiment of FIG. 4, the processor which is resident in each remote console 62 executes the console application software 56. It should be noted that the operating system 64 of each remote console is typically different than that of the operating system 58 of the site controller but there is no requirement that this is necessary to practice the invention.

FIG. 5 illustrates a third embodiment 80 of the present invention which includes a coresident operator console controlled by coresident console application software 56 within the site controller which has a site controller processor which concurrently executes site control application software 54 and the coresident console application software and at least one remote operator console 62 with each remote operator console having a remote console processor and associated memory which is controlled by console application software 56 with each console application software being identical upon execution by their associated processor. The system, as illustrated in FIG. 5, also has the cost savings of the embodiment of FIG. 3 of eliminating a separate processor, housing and power supply for supporting the coresident operator console which is contained within the site controller and coresident operator console 52.

Figure 6:
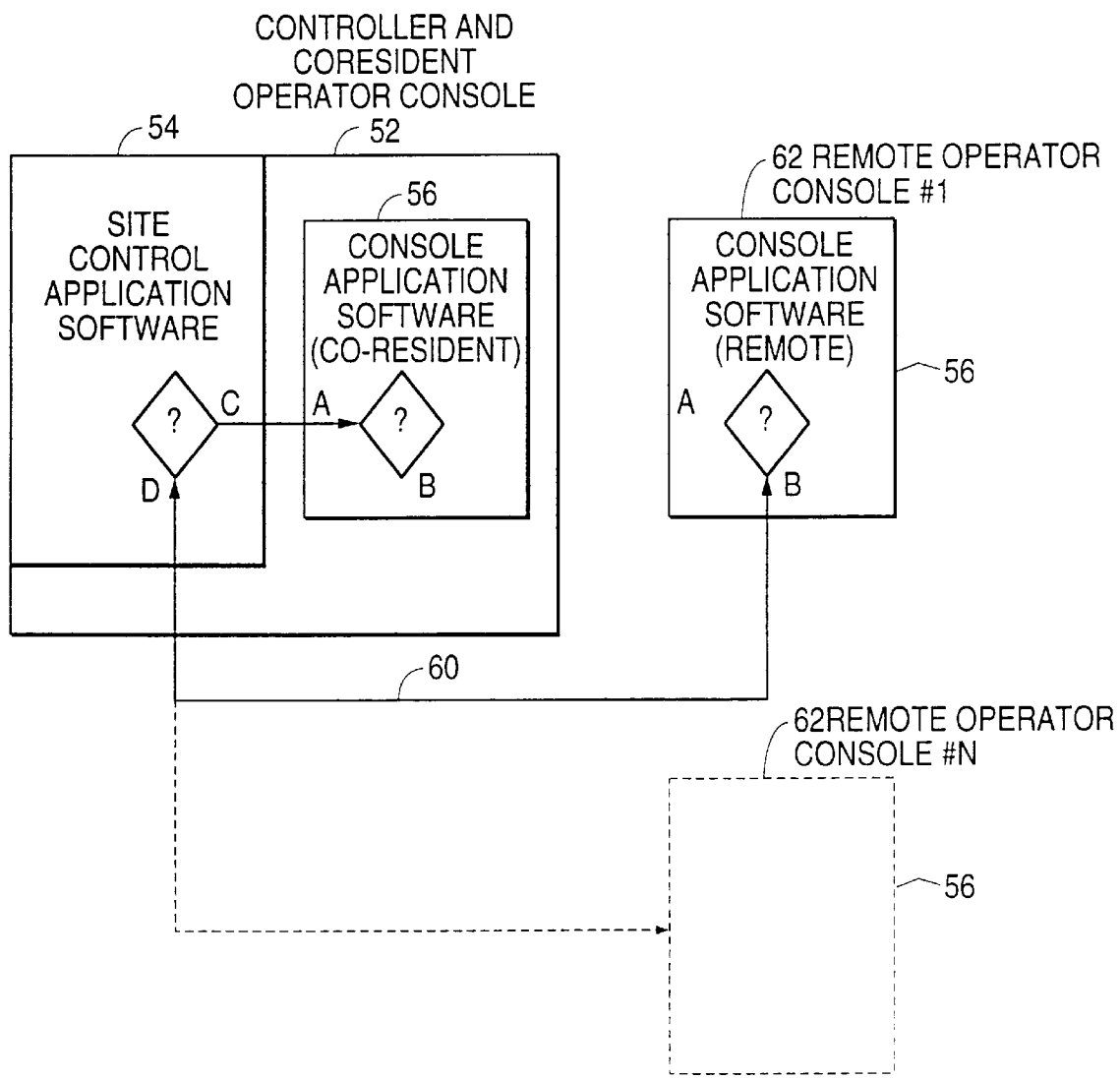
FIG. 6 is a block diagram of programming illustrating the transfer of information in accordance with the present invention between a site control application program and a coresident console application program and the site control application program and a remote console application program which may be resident in a plurality of remote consoles.

FIG. 6 illustrates a block diagram illustrating communication paths between the site control application software 54, which is executed by the site controller processor contained within the site controller and coresident operator console 52 and the console application software 56 which is concurrently executed by the site controller processor and further between the site control application software and each remote operator console 62 and the console application software contained in each of the remote consoles 1–N and the return communication paths. As illustrated, the site control application software 54 communicates from a decision point C to a decision point A within the console application software 56 which is coresident with the coresident operator console of the site controller and coresident operator console 52. Additionally, the site control application software 54 communicates from point D in the decision point to a decision point at B in the console application software 56 located within each of the 1–N remote consoles 62. The communication between point C and point A is via at least one internal message transfer which may be, but is not limited to, at least one mailbox. The communication between the site control application software 54 and the at least one remote console application software(s) 56 located in each of the 1–N remote consoles 62 are via communications link 60 which is typically, but not limited to, a serial communications link. The communications between points C and A and points D and B are formatted with an identical internal message protocol. An embodiment of programming for implementing the communications between the decision points from point C to point A and from point D to point B is set forth on pages 23–86 of the Appendix. Communications from the console application software 56, which is coresident with the site control application software of the site controller and coresident operator console 52, are controlled by interrogation of an operating mode of the console application programming which may be accomplished, for example, without limitation by reading a flag which is settable with a value with a setting of the flag with the value being read by the console application software to transfer information to the site control application software via at least one internal message transfer or over communications link 60. These paths between decision points are from A to C when the coresident console application software 56 is communicating with the site control application software 54 and from B to D when the remote console application software is communicating with the site control application software.

It should be understood that the universal console application of the present invention is an article of manufacture which is stored upon a mass storage device such as, but not limited to, at least one floppy disk. The present invention may be practiced by the storing of programming without limitation as to the type of mass storage used for program storage or to its environment and how the programming is read, compiled or executed by a processor.

While the invention has been described in terms of its preferred embodiments, it should be understood that numerous modifications may be made thereto without departing from the spirit and scope of the invention. While, as illustrated, the preferred embodiments of the present invention are utilized in fuel dispensing applications, it should be understood that other point of sale systems, such as retail stores, may utilize the present invention. It is intended that all such modifications of the invention fall within the scope of the appended claims.

APPENDIX

An Appendix is attached hereto containing 86 pages of source code which has been selected from source code used in the Assignee's G-SITE™ petroleum station control and electronic point of sale system and a floppy disk containing a complete source code listing of programming used in the coresident and remote console programming application as well as that portion of programming used in the site controller to determine the method of data transmission to the console application programming including the aforementioned 86 pages. The source code on the floppy disk is contained in an envelope, is entitled "G-SITE™ Control and Advanced Console Source Code 10/9/95" Restore with tar xvf Copyright Gilbarco Inc. 1995" and is a listing of a preferred form of programming which may be used for implementing the control of the systems illustrated in FIGS. 3 and 5 of the drawings and the communication options between the softwares illustrated in FIG. 6 and is that programming used to determine the method of transmission of messages between the site controller and the coresident and remote console applications which is currently marketed and sold by the Assignee under the trademark G-SITE™ System.

The attached 86 pages of source code is comprised of several modules for implementing various programming functions of the present invention. Pages 1–4 are a module containing a link script that sets a flag in an operating system of a site controller processor which also controls a coresident operator console; pages 5–7 are a module containing a link script that sets a flag in an operating system of a remote console processor; pages 8–14 are a module containing console startup code that causes reading of the flags set by the link scripts of pages 1–7 that determine if the console is a coresident or a remote console; pages 15–22 are a module containing console code which selects a path of transmission of information from the console application programming to the site control application programming; and pages 23–86 are a module containing routing decisions for the transmission of information from site controller application software to the coresident or at least one remote console application programming.

The subject matter of the Appendix is copyrighted. A copy of the Appendix may be made for the purpose of analyzing or understanding the present invention but a copy may not be made for any other purpose including executing the program modules contained herein.

The source code listings are stored on the floppy disk in industry standard UNIX tar format. The files may be extracted from the floppy disk by following these steps:

1. Insert the floppy disk into the disk drive of a computer running UNIX.
2. Type the following and then press the [ENTER] key:tar xv
3. Verify that the resulting tar.out.Z file is 1,355,169 bytes in size.
4. Type the following and then press the [ENTER] key: uncompress tar.out.Z
5. Type the following and then press the [ENTER] key: tar xvf tar.out Following this procedure will copy the source code listings from the floppy disk to the hard disk drive of the computer running UNIX. The aforementioned source code listings are logically arranged in directories with the console application programming being contained entirely under the directory gsite/console and the relevant site controller application programming being contained entirely under the directory gsite/controlr.

We claim:

1. A memory storing a control program for use within a point of sale system including at least one operator console controlled with the control program with each operator console communicating with at least one console device connected thereto with information transmitted to and from each operator console being formatted with a message level protocol with the control program being executable by a site controller processor of the point of sale system which controls functioning of the point of sale system and being executable by a remote console processor controlling each console which is remote from the site controller and connected to the site controller by a communications link comprising:

coresident console application programming, for execution by the site controller processor, for controlling communications between site control application programming and coresident console application programming including formatting information for transmission between the site control application programming and the local console application programming with the message level protocol; and remote console application programming, for execution by each remote console processor, for controlling communications on a communications link between the site control application programming and remote console application programming including formatting information with the message level protocol for transmission between the site control application programming and the remote console application programming.

2. A memory storing a control program in accordance with claim 1 wherein:

the coresident console application programming further is for controlling communications between the coresident console application programming and the site control application programming and for controlling at least one peripheral device coupled to a coresident operator console with a communication link; and the remote console application programming further is for controlling communications between each remote console and at least one remote console device connected thereto and processing information received from the at least one console device connected thereto for transmission to the site controller.

3. A memory storing a control program in accordance with claim 1 wherein:

the site control application programming is further for controlling at least one peripheral device and for controlling transmission of communications to at least one console application programming from the site control application programming.

4. A memory storing a control program in accordance with claim 3 wherein:

the site control application programming controls transmission of communications to a plurality of console application programs, including the transmission of information from the site control application programming to the coresident console application programming and the transmission of information from the site control application programming on the communications link to the at least one remote console application programming.

5. A memory storing a control program in accordance with claim 4 wherein:

programming within the site control application programming and within the coresident console application programming uses at least one internal message transfer implemented with programming to transmit the information between the site application control programming to the coresident console application programming and uses the communications link to transmit the information to the at least one remote console application programming.

6. A memory storing a control program in accordance with claim 1 wherein:

the console application programming as loaded into a memory associated with the site controller processor and the console application programming as loaded into a memory associated with each remote console processor is identical.

7. A memory storing a control program in accordance with claim 2 wherein:

the console application programming as loaded into a memory associated with the site controller processor and the console application programming as loaded into a memory associated with each remote console processor is identical.

8. A memory storing a control program in accordance with claim 3 wherein:

the console application programming as loaded into a memory associated with the site controller processor and the console application programming as loaded into a memory associated with each remote console processor is identical.

9. A memory storing a control program in accordance with claim 4 wherein:

the console application programming as loaded into a memory associated with the site controller processor and the console application programming as loaded into a memory associated with each remote console processor is identical.

10. A memory storing a control program in accordance with claim 5 wherein:

the console application programming as loaded into a memory associated with the site controller processor and the console application programming as loaded into a memory associated with each remote console processor is identical.

11. A memory storing site control application programming for use within a point of sale system, said point of sale system including a plurality of operator consoles with each operator console communicating with at least one console device connected thereto with the site control application programming being executable by a site controller processor which controls functioning of the point of sale system comprising:

programming within the site control application programming for controlling transmission of communications from the site control programming to a plurality of operator console application programs including a coresident operator console application programming executed by the site controller and at least one remote operator console application programming with each remote console application programming being executable by a remote console processor;

wherein the programming within the site control application programming and within the coresident console application programming uses at least one internal message transfer implemented with programming to transmit the information between the site application control programming and the coresident console application programming and uses a communications link to transmit the information to each remote console application programming.

12. A memory device storing a control program for use within a point of sale system including at least one operator console controlled with the control program with each operator console communicating with at least one console device connected thereto with the control program being executable by a site controller processor of the point of sale system which controls functioning of the point of sale system and which is operatively associated with a coresident console and being executable by a remote console processor within each console which is remote from the site controller and connected to the site controller by a communications link comprising:

coresident console application programming for controlling operation of a coresident operator console which is executable by the site controller processor; and remote console application programming for controlling operation of each remote console within the point of sale system which is executable by a remote console processor;

wherein the console application programming as loaded into a memory associated with the site controller processor and the console application programming as loaded into a memory associated with each remote console processor is identical.

13. A memory storing a control program in accordance with claim 12 wherein:

the coresident console application programming is further for controlling transmission of information from the coresident operator console to the at least one console device which is connected thereto and for controlling processing of information received from the at least one console device connected thereto; and the remote console application programming is further for controlling transmission of information from any remote console to at least one remote console device which is connected thereto and for controlling processing of information received from the at least one remote console device connected thereto.

14. A memory storing a control program in accordance with claim 12 wherein:

the coresident and remote console application programming controls the formatting of information transmitted between the coresident console application programming and the site control application programming with a message level protocol and controls the formatting of information transmitted between the remote console application programming and the site control application programming with the message level protocol.

15. A memory storing a control program in accordance with claim 13 wherein:

the coresident and remote console application programming controls the formatting of information transmitted between the coresident console application programming and the site control application programming with a message level protocol and controls the formatting of information transmitted between the remote console application programming and the site control application programming with the message level protocol.

16. A memory storing a control program in accordance with claim 12 further comprising:

site control application programming for controlling at least one peripheral device connected to the site controller with the site control application programming and the coresident console application programming being executable concurrently by the site controller processor, at least one internal message transfer implemented in programming for controlling transmission of information between the site control application programming and the coresident console application programming including the transmission of information to the coresident console and programming for controlling the transmission of information from the site controller application programming to any remote console application programming over the communications link.

17. A memory storing a control program in accordance with claim 13 further comprising:

site control application programming for controlling at least one peripheral device connected to the site controller with the site control application programming and the coresident console application programming being executable concurrently by the site controller processor, at least one internal message transfer implemented in programming for controlling transmission of information between the site control application programming and the coresident console application programming including the transmission of information to the coresident console and programming for controlling the transmission of information from the site controller application programming to any remote console application programming over the communications link.

18. A memory storing a control program in accordance with claim 14 further comprising:

site control application programming for controlling at least one peripheral device connected to the site controller with the site control application programming and the coresident console application programming being executable concurrently by the site controller processor, at least one internal message transfer implemented in programming for controlling transmission of information between the site control application programming and the coresident console application programming including the transmission of information to the coresident console and programming for controlling the transmission of information from the site controller application programming to any remote console application programming over the communications link.

19. A memory storing a control program in accordance with claim 15 further comprising:

site control application programming for controlling at least one peripheral device connected to the site controller with the site control application programming and the coresident console application programming being executable concurrently by the site controller processor, at least one internal message transfer implemented in programming for controlling transmission of information between the site control application programming and the coresident console application programming including the transmission of information to the coresident console and programming for controlling the transmission of information from the site controller application programming to any remote console application programming over the communications link.

20. A point of sale system comprising:

a site controller including a site controller processor which controls functioning of the point of sale system and controls at least one peripheral device connected thereto with a communications link and controlling a coresident console with the coresident console being connected to at least one console device which is controlled by the coresident console;

at least one remote console with each remote console being a peripheral device of the site controller processor and being connected to at least one remote console device which is controlled by a remote processor of the remote console connected thereto;

a communications link connecting the site controller to the at least one remote console for transmitting information between the site controller and the at least one remote console; and a console application program controlling each of the consoles with the console application program including coresident console application programming controlling operation of the coresident console which is executed by the site controller processor and remote console application programming controlling operation of each remote console within the point of sale system which is executed by each remote processor.

21. A point of sale system in accordance with claim 20 wherein:

the coresident console application programming also controls transmission of information from the coresident console to the at least one console device connected thereto and controls processing of information received from the at least one console device connected thereto; and the remote console application programming also controls transmission of information from the at least one remote console to the at least one remote console device connected thereto and controls processing of information received from the at least one remote console device connected thereto.

22. A point of sale system in accordance with claim 20 wherein:

the coresident and remote console application programming controls the formatting of information transmitted between the local and remote console application programming and the site control application with an identical message level protocol.

23. A point of sale system in accordance with claim 21 wherein:

the coresident and remote console application programming controls the formatting of information transmitted between the local and remote console application programming and the site control application with an identical message level protocol.

24. A point of sale system in accordance with claim 20 further comprising:

site control application programming controlling at least one peripheral device connected to the site controller with the site control application programming and the coresident console application programming being executable concurrently by the site controller processor, at least one internal message transfer implemented in programming controlling transmission of information between the site control application programming and the coresident console application programming and programming controlling the transmission of information from the site controller application programming to any remote console application programming over the communications link.

25. A point of sale system in accordance with claim 21 further comprising:

site control application programming controlling at least one peripheral device connected to the site controller with the site control application programming and the coresident console application programming being executable concurrently by the site controller processor, at least one internal message transfer implemented in programming controlling transmission of information between the site control application programming and the coresident console application programming and programming controlling the transmission of information from the site controller application programming to any remote console application programming over the communications link.

26. A point of sale system in accordance with claim 22 further comprising:

site control application programming controlling at least one peripheral device connected to the site controller with the site control application programming and the coresident console application programming being executable concurrently by the site controller processor, at least one internal message transfer implemented in programming controlling transmission of information between the site control application programming and the coresident console application programming and programming controlling the transmission of information from the site controller application programming to any remote console application programming over the communications link.

27. A point of sale system in accordance with claim 23 further comprising:

site control application programming controlling at least one peripheral device connected to the site controller with the site control application programming and the coresident console application programming being executable concurrently by the site controller processor, at least one internal message transfer implemented in programming controlling transmission of information between the site control application programming and the coresident console application programming and programming controlling the transmission of information from the site controller application programming to any remote console application programming over the communications link.

28. A point of sale system in accordance with claim 20 further comprising:

site control application programming controlling transmission of communications from the site control application programming to a plurality of console application programs including the coresident console application programming and each remote console application programming.

29. A point of sale system in accordance with claim 28 wherein:

the site control application programming and the coresident console application programming uses at least one internal message transfer implemented with programming to transmit the information between the site application control programming and the coresident console application programming and controls a communications link to transmit the information to each remote console application programming.

30. A point of sale system in accordance with claim 20 further comprising:

the remote console application programming controls transmission of communications from the remote console application programming to the site control application programming of the point of sale system with the remote console application programming causing the communications link to transmit the information from the remote console application programming to the site controller with the transmission of communications being determined by an interrogation of an operator mode of the remote console application programming.

31. A point of sale system in accordance with claim 21 further comprising:

the remote console application programming controls transmission of communications from the remote console application programming to the site control application programming of the point of sale system with the remote console application programming causing the communications link to transmit the information from the remote console application programming to the site controller with the transmission of communications being determined by an interrogation of an operator mode of the remote console application programming.

32. A point of sale system in accordance with claim 22 further comprising:

the remote console application programming controls transmission of communications from the remote console application programming to the site control application programming of the point of sale system with the remote console application programming causing the communications link to transmit the information from the remote console application programming to the site controller with the transmission of communications being determined by an interrogation of an operator mode of the remote console application programming.

33. A point of sale system in accordance with claim 23 further comprising:

the remote console application programming controls transmission of communications from the remote console application programming to the site control application programming of the point of sale system with the remote console application programming causing the communications link to transmit the information from the remote console application programming to the site controller with the transmission of communications being determined by an interrogation of an operator mode of the remote console application programming.

34. A point of sale system in accordance with claim 24 further comprising:

the remote console application programming controls transmission of communications from the remote console application programming to the site control application programming of the point of sale system with the remote console application programming causing the communications link to transmit the information from the remote console application programming to the site controller with the transmission of communications being determined by an interrogation of an operator mode of the remote console application programming.

35. A point of sale system in accordance with claim 25, further comprising:

the remote console application programming controls transmission of communications from the remote console application programming to the site control application programming of the point of sale system with the remote console application programming causing the communications link to transmit the information from the remote console application programming to the site controller with the transmission of communications being determined by an interrogation of an operator mode of the remote console application programming.

36. A point of sale system in accordance with claim 20 wherein:

the console application programming as loaded into a memory associated with the site controller processor and the console application programming as loaded into a memory associated with each remote console processor is identical.

37. A point of sale system in accordance with claim 21 wherein:

the console application programming as loaded into a memory associated with the site controller processor and the console application programming as loaded into a memory associated with each remote console processor is identical.

38. A point of sale system in accordance with claim 22 wherein:

the console application programming as loaded into a memory associated with the site controller processor and the console application programming as loaded into a memory associated with each remote console processor is identical.

39. A point of sale system in accordance with claim 24 wherein:

the console application programming as loaded into a memory associated with the site controller processor and the console application programming as loaded into a memory associated with each remote console processor is identical.

40. A point of sale system in accordance with claim 28 wherein:

the console application programming as loaded into a memory associated with the site controller processor and the console application programming as loaded into a memory associated with each remote console processor is identical.

41. A point of sale system in accordance with claim 30 wherein:

the console application programming as loaded into a memory associated with the site controller processor and the console application programming as loaded into a memory associated with each remote console processor is identical.

42. A memory storing coresident console application programming for use within a point of sale system including a coresident operator console communicating with at least one console device connected thereto with the coresident console application programming being executable by a site controller processor which controls functioning of the point of sale system of a site controller coresident with the coresident operator console comprising:

programming for controlling transmission of communications from the coresident console application programming to the site control application programming which controls at least one device connected thereto with a communication link; and programming using at least one internal message transfer implemented with programming to transmit the communications from the coresident console application programming to the site application control programming.

43. A method of operation of a point of sale system having a site controller including a site controller processor which controls functioning of the point of sale system and at least one peripheral device connected thereto with a communications link and controlling a coresident console with the coresident console being connected to at least one console device which is controlled by the coresident console, at least one remote console with each remote console being a peripheral device of the site controller processor and being connected to at least one remote console device which is controlled by a remote processor of the remote console connected thereto, a communications link connecting the site controller to the at least one remote console transmitting information between the site controller and the at least one remote console, and a console application program comprising:

controlling operation of the coresident console with coresident console application programming within the console application programming which is executed by the site controller processor;

controlling operation of each remote console within the point of sale system with remote application programming within the console application program which is executed by each remote processor; and controlling formatting of information transmitted between the coresident and remote console application programming and site control application programming with an identical message level protocol.

44. A method in accordance with claim 43 further comprising:

controlling transmission of information from the coresident console to the at least one console device connected thereto and processing of information received from the at least one console device connected thereto with the coresident console application programming; and controlling transmission of information from the at least one remote console to the at least one remote console device connected thereto controlling processing of information received from the at least one remote console device connected thereto with the remote application programming.

45. A method in accordance with claim 43 further comprising:

at least one peripheral device connected to the site controller with the site control application programming and the coresident console application programming being executable concurrently by the site controller processor, controlling transmission of information between the site control application programming and the coresident console application programming with at least one internal message transfer and controlling the transmission of information from the site controller application programming to any remote console application programming over the communications link with programming.

46. A method in accordance with claim 44 further comprising:

at least one peripheral device connected to the site controller with the site control application programming and the coresident console application programming being executable concurrently by the site controller processor, controlling transmission of information between the site control application programming and the coresident console application programming with at least one internal message transfer and controlling the transmission of information from the site controller application programming to any remote console application programming over the communications link with programming.

47. A method in accordance with claim 43 further comprising:

controlling transmission of communications from the site control application programming to a plurality of console application programs including the coresident console application programming and each remote console application programming with the site control application programming.

48. A method in accordance with claim 47 wherein:

using at least one internal message transfer implemented with programming to transmit the information between the site application control programming and the coresident console application programming and controlling a communications link to transmit the information to each remote console application programming from the site control application programming.

49. A method in accordance with claim 43 further comprising:

controlling transmission of communications from the remote console application programming to the site control application programming of the point of sale system with the remote console application programming causing the communications link to transmit the information from the remote console application programming to the site controller with the transmission of communications being determined by an interrogation of an operating mode of the remote console application programming.

50. A method in accordance with claim 44 further comprising:

controlling transmission of communications from the remote console application programming to the site control application programming of the point of sale system with the remote console application programming causing the communications link to transmit the information from the remote console application programming to the site controller with the transmission of communications being determined by an interrogation of an operating mode of the remote console application programming.

51. A method in accordance with claim 45 further comprising:

controlling transmission of communications from the remote console application programming to the site control application programming of the point of sale system with the remote console application programming causing the communications link to transmit the information from the remote console application programming to the site controller with the transmission of communications being determined by an interrogation of an operating mode of the remote console application programming.

52. A method in accordance with claim 46 further comprising:

controlling transmission of communications from the remote console application programming to the site control application programming of the point of sale system with the remote console application programming causing the communications link to transmit the information from the remote console application programming to the site controller with the transmission of communications being determined by an interrogation of an operating mode of the remote console application programming.

53. A method in accordance with claim 43 wherein:

the console application programming as loaded into a memory associated with the site controller processor and the console application programming as loaded into a memory associated with each remote console processor is identical.

54. A method in accordance with claim 44 wherein:

the console application programming as loaded into a memory associated with the site controller processor and the console application programming as loaded into a memory associated with each remote console processor is identical.

55. A method in accordance with claim 45 wherein:

the console application programming as loaded into a memory associated with the site controller processor and the console application programming as loaded into a memory associated with each remote console processor is identical.

56. A method in accordance with claim 47 wherein:

the console application programming as loaded into a memory associated with the site controller processor and the console application programming as loaded into a memory associated with each remote console processor is identical.

57. A method in accordance with claim 48 wherein:

the console application programming as loaded into a memory associated with the site controller processor and the console application programming as loaded into a memory associated with each remote console processor is identical.

58. A method in accordance with claim 49 wherein:

the console application programming as loaded into a memory associated with the site controller processor and the console application programming as loaded into a memory associated with each remote console processor is identical.

59. A point of sale system comprising:

a site controller including a site controller processor which controls functioning of the point of sale system and controls at least one peripheral device connected thereto with a communications link and controlling a coresident console with the coresident console being connected to at least one console device which is controlled by the coresident console with the site controller and coresident console having a common housing and power supply; and a coresident console application programming for controlling operation of the coresident console and site control application programming for controlling operation of the site controller with the site control application programming and coresident console application programming being concurrently executed by the site controller processor.

60. A point of sale system in accordance with claim 59 wherein:

the site control application programming controls at least one peripheral device connected to the site controller and at least one internal message transfer implemented in programming controls transmission of information between the site control application programming and the coresident console application programming.

61. A point of sale system in accordance with claim 59 wherein:

communications between the site control application programming and the coresident operator console programming use a message level protocol.

62. A point of sale system in accordance with claim 60 wherein:

communications between the site control application programming and the coresident operator console programming use a message level protocol.

* * * * *